US012769859B2

(12) United States Patent
Negi et al.

(10) Patent No.: US 12,769,859 B2
(45) Date of Patent: Oct. 20, 2026

(54) TECHNIQUES FOR MANAGING DIGITAL MEDIA ITEM DELIVERY QUEUES

(71) Applicant: Apple Inc., Cupertino, CA (US)

(72) Inventors: Yuvraj S. Negi, San Jose, CA (US); Jonathan W. Reiher, Bainbridge Island, WA (US); Bagath S. Pugazhendhi, San Jose, CA (US); David L. Neumann, Portland, OR (US); Li Yang Lee, Newcastle, WA (US); Dylan A. Eyster, Santa Clara, CA (US); Hannah M. Jackson, Seattle, WA (US); Madhusudan Rao, Dublin, CA (US); Merlyne G. Michael, Sunnyvale, CA (US); Michael C. Okolo, Seattle, WA (US); Na Tian, Mountain View, CA (US); Samiran Adak, Telangana (IN); Win M. Htay, Santa Clara, CA (US); Yichen Liu, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/747,701

(22) Filed: Jun. 19, 2024

(65) Prior Publication Data

US 2025/0111072 A1 Apr. 3, 2025

Related U.S. Application Data

(60) Provisional application No. 63/587,104, filed on Sep. 30, 2023.

(51) Int. Cl.
*G06F 21/62* (2013.01)

(52) U.S. Cl.
CPC ................................ *G06F 21/6218* (2013.01)

(58) Field of Classification Search
None
See application file for complete search history.

(56) References Cited

U.S. PATENT DOCUMENTS

| | | | |
|---|---|---|---|
| 2010/0131973 A1 | 5/2010 | Dillon et al. | |
| 2013/0060616 A1 | 3/2013 | Block et al. | |
| 2019/0268643 A1 * | 8/2019 | Raley | G06Q 20/1235 |

OTHER PUBLICATIONS

PCT Patent Application No. PCT/US2024/038729—International Search Report and Written Opinion dated Nov. 20, 2024.

* cited by examiner

*Primary Examiner* — Brandon Hoffman
(74) *Attorney, Agent, or Firm* — DICKINSON WRIGHT RLLP

(57) ABSTRACT

The described embodiments set forth techniques for managing digital media item delivery queues associated with a user and/or with a user device. The techniques provide a framework for establishing and subsequently modifying or limiting access to an allocation for digital media items managed via a digital media item delivery queue associated with a user and/or a user device. In some cases, a user and/or user device is allowed limited access to a digital media item delivery queue allocation, while a negative status for a previously provided digital media item is unresolved, based on a set of limited access criteria being satisfied. Exemplary limited access criteria include an account standing for a user of the user device or a type of digital media item request, e.g., a subscription renewal or modification to a current, ongoing subscription for the user device or a user thereof, and the like.

17 Claims, 7 Drawing Sheets

TECHNIQUES FOR MANAGING DIGITAL MEDIA ITEM DELIVERY QUEUES

CROSS-REFERENCE TO RELATED APPLICATIONS

The present application claims the benefit of U.S. Provisional Application No. 63/587,104, entitled "TECHNIQUES FOR MANAGING PRODUCT QUEUES," filed Sep. 30, 2023, the content of which is incorporated by reference herein in its entirety for all purposes.

FIELD

The described embodiments set forth techniques for managing digital media item delivery queues associated with a user and/or a user device. For example, the techniques provide for i) modifying an allocation for digital media items, or ii) limiting access to a subset of digital media items for a digital media item delivery queue, based on authorization statuses for a history of digital media items provided to the user and/or to the user device.

BACKGROUND

Recent years have shown a proliferation in the number of individuals who own and operate computing devices (e.g., wearables, smartphones, tablets, etc.). Typically, an individual uses their computing device to conduct various activities throughout the day, e.g., placing phone calls, sending and receiving electronic messages, accessing the internet, and the like. In some cases, operating systems installed on the computing devices—in particular, native, first party software applications that come pre-installed on the operating systems—can enable users to carry out various activities. In addition, third party software applications can be installed on the computing device to provide additional services. Software applications on the computing device can allow a user of the computing device to request various digital media items, such as digital content for media streaming, digital publication, or gaming, as well as additional software applications to install and use on the computing device. The computing device can also be configured to allow the user to request various physical items, such as accessories for the computing device.

SUMMARY

The described embodiments set forth techniques for managing digital media item delivery queues associated with a user and/or a user device. For example, the techniques provide a framework for modifying an allocation for digital media items or limiting access to a subset of digital media items for a digital media item delivery queue based on authorization statuses for a history of digital media items provided to the user and/or to the user device.

Digital media items can be provided to a user device (or to a user for a user device) in advance of final authorization for use of the digital media item by the user device or the user. Subsequent to provisioning the digital media item, a positive status indication or a negative status indication for final authorization for the digital media item can be received by a digital media item management system. A narrowly restrictive policy to disallow future digital media item provisioning in response to a negative status indication for final authorization of a previously provided digital media item can negatively impact a capability of the user device for obtaining digital content and for acquiring physical items via the user device. There exists a need for techniques for managing digital media item delivery queues for a user and/or for one or more user devices of a user that permit limited continued access to digital media items and increase customer retention while resolving authorization issues for previous digital media item provisioning.

One embodiment sets forth a method for managing digital media item delivery queues. According to some embodiments, the method can be implemented by a server device, and includes the steps of: i) providing, responsive to receipt of a request from a user device, first digital content to the user device in advance of final authorization for the request for the first digital content; ii) allocating the first digital content to a digital media item delivery queue for a user of the user device; iii) receiving a negative status indication for the final authorization for the request for the first digital content; iv) determining, responsive to a second request from the user for second digital content after receipt of the negative status indication, whether one or more limited access criteria are satisfied for the user of the user device; and v) providing the second digital content to the user device, in advance of final authorization for the second request for the second digital content, when the one or more limited access criteria are satisfied. In some embodiments, the server device adjusts, e.g., lowers, an allocation level for the digital media item delivery queue for the user device while a negative status indication is pending and re-adjusts, e.g., raises, the allocation level for the digital media item delivery queue for the user device to a previously established level when the negative status indication is resolved. Exemplary limited access criteria include an account standing for a user of the user device or a type of digital content requested, such as a subscription renewal or modification to a current, ongoing subscription for the user device or a user thereof.

Another embodiment sets forth a method for managing digital media item delivery queues. According to some embodiments, the method can be implemented by a server device, and includes the steps of: i) initializing a session allocation for a digital media item delivery queue for a user device; ii) allocating to the digital media item delivery queue a first digital media item provided to the user device responsive to a request from the user device; iii) receiving a negative status indication for authorization for the user device for the first digital media item; iv) restricting, responsive to the negative status indication, the session allocation for the digital media item delivery queue for the user device to a limited set of digital media items; v) determining, responsive to a second request for a second digital media item from the user device, whether the second digital media item belongs to the limited set of digital media items; and vi) providing the second digital media item to the user device when the second digital media item belongs to the limited set of digital media items. In some embodiments, the server device blocks access to the second digital media item for the user device, when the second digital media item does not belong to the limited set of digital media items, while the negative status indication is pending, and removes a restriction to the limited set of digital media items for the session allocation for the digital media item delivery queue for the user device, when the negative status indication for authorization for the user device for the first digital media item is resolved. In some embodiments, the limited set of digital media items include digital media items of a particular type, such as a renewal of an existing digital content subscription or a digital media item having a value below a designated threshold value.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth techniques for mitigating errors tied to software applications. For example, the techniques provide a framework for notifying users of software applications when their payment credentials become invalid, and for enabling the users to update their payment credentials to mitigate the invalidity.

It is noted that although the following disclosure primarily focuses on payment-related errors associated with software applications, the embodiments are in no way limited to such a scope. On the contrary, the embodiments are applicable to all conceivable errors, issues, etc., that may arise place in association with software applications, such as errors, issues, etc. related to user accounts, billings, configurations, and so on.

Figure 1:
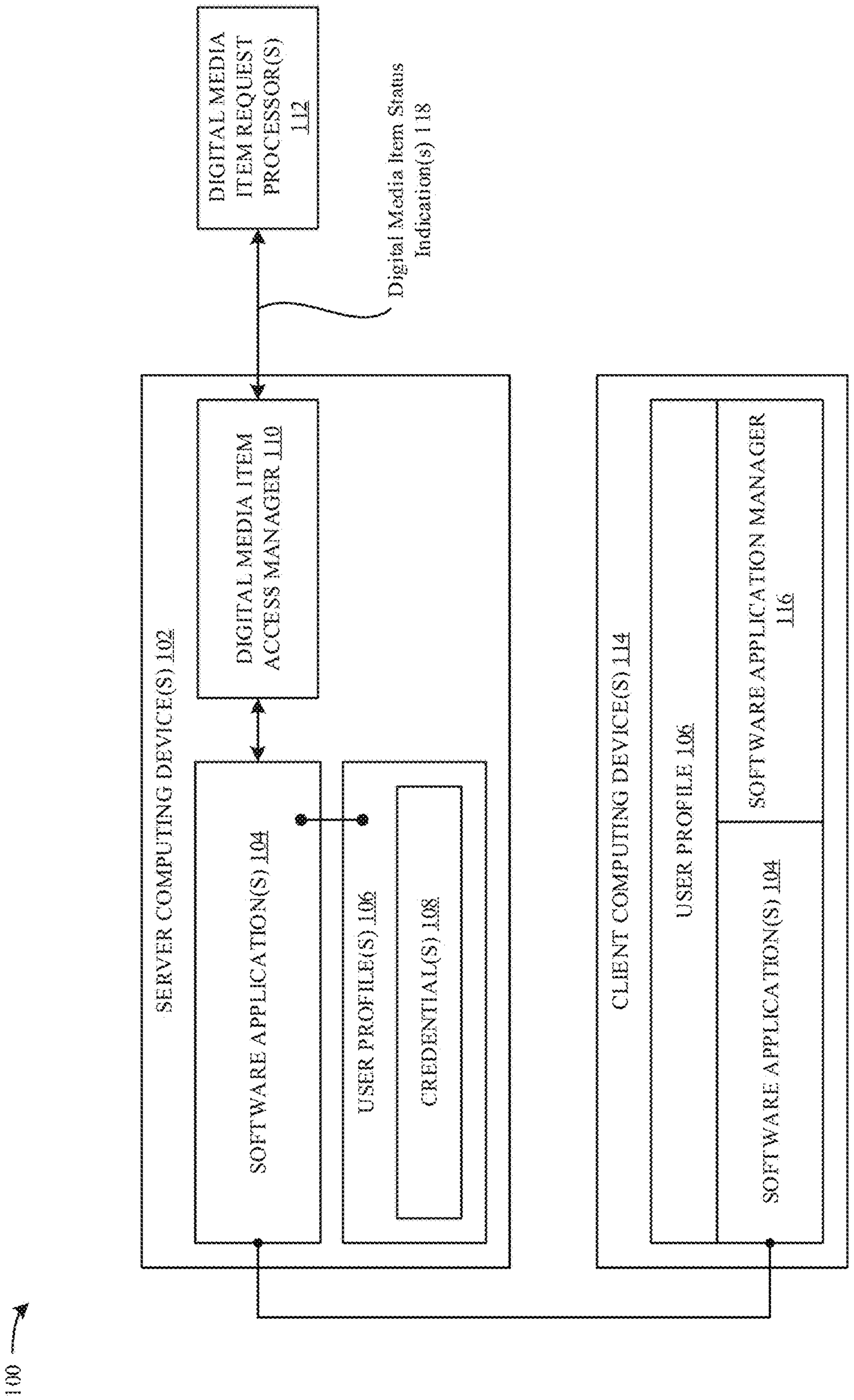
FIG. 1 illustrates a block diagram of different components of a system that can be configured to implement the various techniques described herein, according to some embodiments.

FIG. 1 illustrates a block diagram of different components of a system 100 that can implement the various techniques described herein, according to some embodiments. As shown in FIG. 1, the system 100 can include one or more server computing devices 102 (also referred to as server devices 102) that enable users of client computing devices 114—e.g., smart phones, tablets, laptops, desktops, etc.—(also referred to as client devices 114 or user devices 114) to request and be provisioned digital media items via the server computing devices 102. In some embodiments, the client computing devices 114 can execute a counterpart software application that enables the client computing devices 114 to interface with the server computing devices 102 to request digital media items. Exemplary digital media items can include new software applications for a client computing device 114, digital content for an existing or new application on the client computing device 114, or physical items to be used with or supplemental to the client computing device 114.

A client computing device 114 can have any number of software applications 104 installed thereon, and can implement a software application manager 116 that is configured to facilitate installations, executions (e.g., loading, displaying, etc.), and so on, of the software applications 104. Each client computing device 114 can also be associated with a user profile 106. Such an association can be established, for example, when a user of the client computing device 114 provides the requisite information to create, log into, etc., a user profile 106 using the client computing device 114. According to some embodiments, a user profile 106 for a user can include username/password information, contact information associated with the user, demographic information associated with the user, and so on. It is noted that the foregoing examples are not meant to be limiting, and that the user profiles 106 can store any user-related (or other) information, at any level of granularity, without departing from the scope of this disclosure.

As shown in FIG. 1, the server computing device 102 can associate any number of user profiles 106 with a given software application 104. Such associations can be formed, for example, between a given software application 104 and user profiles 106 of users who have installed the software application 104 on at least one client computing device 114. The server computing device 102 can manage information that enables a given user to access different software applications 104. The server computing device 102 can be configured to implement a digital media item access manager 110 that assesses credentials 108 associated with user profiles 106. In some cases, the digital media item access manager 110 can self-determine validity of credential 108 for a user to receive a requested digital media item. In some cases, the digital media item access manager can interface with one or more external digital media item request processors 112 that can provide digital media item status indications 118. In some cases the digital media item access manager 110 can provide initial authorization to provide a digital media item to a user or to a user device, responsive to a request for the digital media item from the user or the user device, and deliver the digital media item in advance of a final authorization for the requested digital media item for the user or the user device, where a digital media item status indication 118 can indicate a positive status or a negative status for a particular digital media item request for the user/user device. The digital media item access manager 110 can manage allocations and/or access to different digital media item types for requests for digital media items from a user/user device based on a history of digital media item status indications 118 for previous digital media item requests. For example, in response to a negative status indication for a previous digital media item provided to the user/user device, the digital media item access manager 110 can adjust an allocation for a digital media item delivery queue or limit access to a subset of digital media items (or digital media item types) until the negative status indication is resolved.

It should be understood that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another (e.g., using the Internet).

A more detailed explanation of these hardware components is provided below in conjunction with FIG. 5. It should additionally be understood that the computing devices can include additional entities that enable the implementation of the various techniques described herein without departing from the scope of this disclosure. It should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1 provides an overview of the manner in which the system 100—in particular, the server computing devices 102 and the client computing devices 114—can implement the various techniques described herein, according to some embodiments. A more detailed breakdown of the manner in which these techniques can be implemented will now be provided below in conjunction with FIGS. 2A, 2B, 3, 4A, and 4B.

Figure 2A:
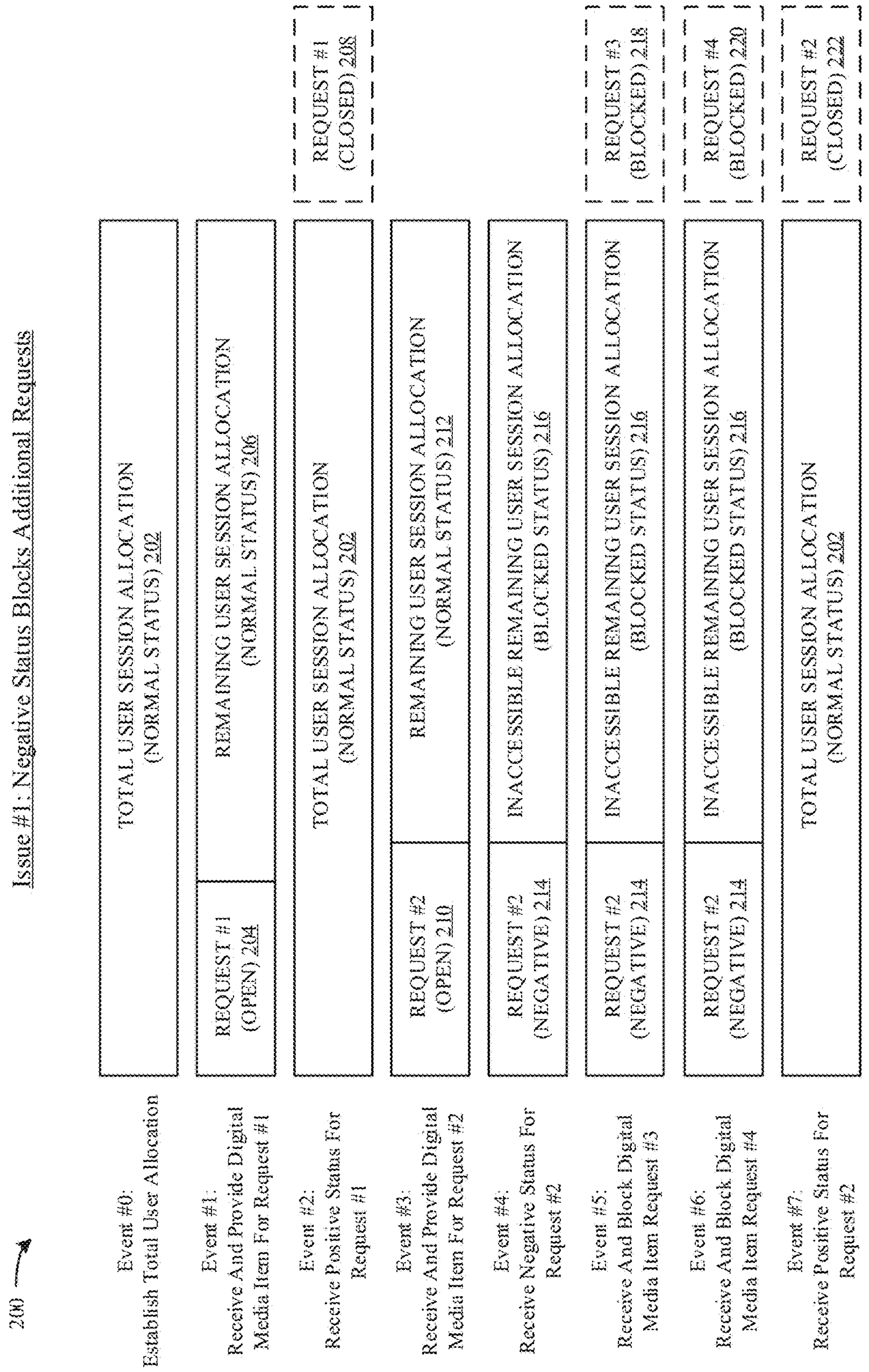
FIGS. 2A and 2B illustrate diagrams of exemplary sequences of events that can impede digital media item provisioning for a user device, according to some embodiments.

FIG. 2A illustrates a diagram 200 of an exemplary sequence of events that can impede digital media item provisioning for a user device 114 or for a user thereof, according to some embodiments. For example, a negative status indication for a first digital media item request can block additional digital media item requests for the user device 114 or for the user thereof. At a first event #0, a network-based server, e.g., a server device 102, can establish a total user session allocation 202 for a digital media item delivery queue for a user device 114 or for a user with an initial normal status indication for the digital media item delivery queue. At a second event #1, the server device 102 can receive, from a user device 114 or from a user thereof, a request for a first digital media item, e.g., request #1, which can be provided to the user device 114 or to the user thereof. The first digital media item can be provided in advance of receipt of a final authorization for providing the first digital media item to the user device 114 or to the user thereof, e.g., based on an initial authorization or a standing authorization for the user device 114 or for the user thereof. The digital media item delivery queue can be updated to reflect the requested and provided first digital media item, as indicated by request #1 with an open status indication in block 204, where request #1 for the first digital media item can occupy a portion of the total user session allocation for the digital media item delivery queue for the user device 114 or for the user thereof, with a remaining user session allocation indicated by block 206 (and having a normal status indication).

At a third event #2, the server device 102 can receive a positive status indication for the request #1 for the first digital media item, which can cause the status of the first request #1 for the first digital media item to be updated to a closed status, as shown in block 208, and the digital media item delivery queue can be updated to reflect closure of the request #1 for the first digital media item, returning to a total user session allocation 202. At a fourth event #3, the server device 102 can receive a request for a second digital media item, e.g., request #2, which can be provided to the user device 114 or to the user thereof. The second digital media item can be provided in advance of receipt of a final authorization for providing the second digital media item to the user device 114 or to the user thereof, e.g., based on an initial authorization or a standing authorization for the user device 114 or for the user thereof. The digital media item delivery queue can be updated to reflect the requested and provided second digital media item, as indicated by request #2 with an open status indication in block 210, where request #2 for the second digital media item can occupy a portion of the total user session allocation for the digital media item delivery queue for the user device 114 or for the user thereof, with a remaining user session allocation indicated by block 212 (and having a normal status indication).

It should be noted that allocation for the first digital media item, request #1, against the total user session allocation can differ from or be the same as the allocation for the second digital media item, request #2. For example, the first and second digital media items can have different (or identical) values, where allocation accounts for digital media item value, or the first and second digital media items can have different count metrics, where allocation accounts for digital media item count metrics. At a fifth event #4, the server device 102 can receive a negative status indication for the second request #2 for the second digital media item, which can cause the status of the second request #2 to be updated to a negative status, as shown in block 214, and the digital media item delivery queue can be updated based on the negative status for the second request #2 to disallow additional digital media item requests while the negative status for the second request #2 remains unresolved. In particular, the digital media item delivery queue can be updated to block access to the remaining user session allocation while the negative status for the second request #2 is unresolved, resulting in a blocked status for the remaining user session allocation of the digital media item delivery queue for the user device 114 or the user thereof, as indicated by block 216.

At a sixth event #5, the server device 102 can receive, from the user device 114 or from the user thereof, a request for a third digital media item, e.g., request #3, which can be blocked from being provided to the user device 114 or to the user thereof based on the blocked status of the remaining user session allocation for the digital media item delivery queue, as indicated by the blocked request #3 in block 218. At a seventh event #6, the server device 102 can receive, from the user device 114 or from the user thereof, a request for a fourth digital media item (or a repeated request for the third digital media item), e.g., request #4, which can also be blocked from being provided to the user device 114 or to the user thereof based on the blocked status of the remaining user session allocation for the digital media item delivery queue, as indicated by the blocked request #4 in block 220.

At an eighth event #7, the server device 102 can receive a positive status indication for the second request #2 for the second digital media item, which can cause the status of the second request #2 for the second digital media item to be updated to a closed status, as shown in block 222, and the digital media item delivery queue can be updated to reflect closure of the request #2 for the second digital media item, returning to a total user session allocation 202. Before resolution of the negative status, however, digital media item requests have been denied. As shown, an unresolved negative status for a previously provided digital media item managed by a digital media item delivery queue can render a remaining user session allocation for the digital media item delivery queue inaccessible, and thereby block additional digital media item requests until the negative status is resolved. This behavior can negatively impact customer experience for digital media item provisioning and/or customer retention for continued digital media item use. For example, a subscription renewal to a digital content service requested by a user can be blocked based on a negative status for a separate digital media item previously requested and provided to the user, and the user can drop the subscription while awaiting resolution of the negative status for the separate digital media item.

Figure 2B:
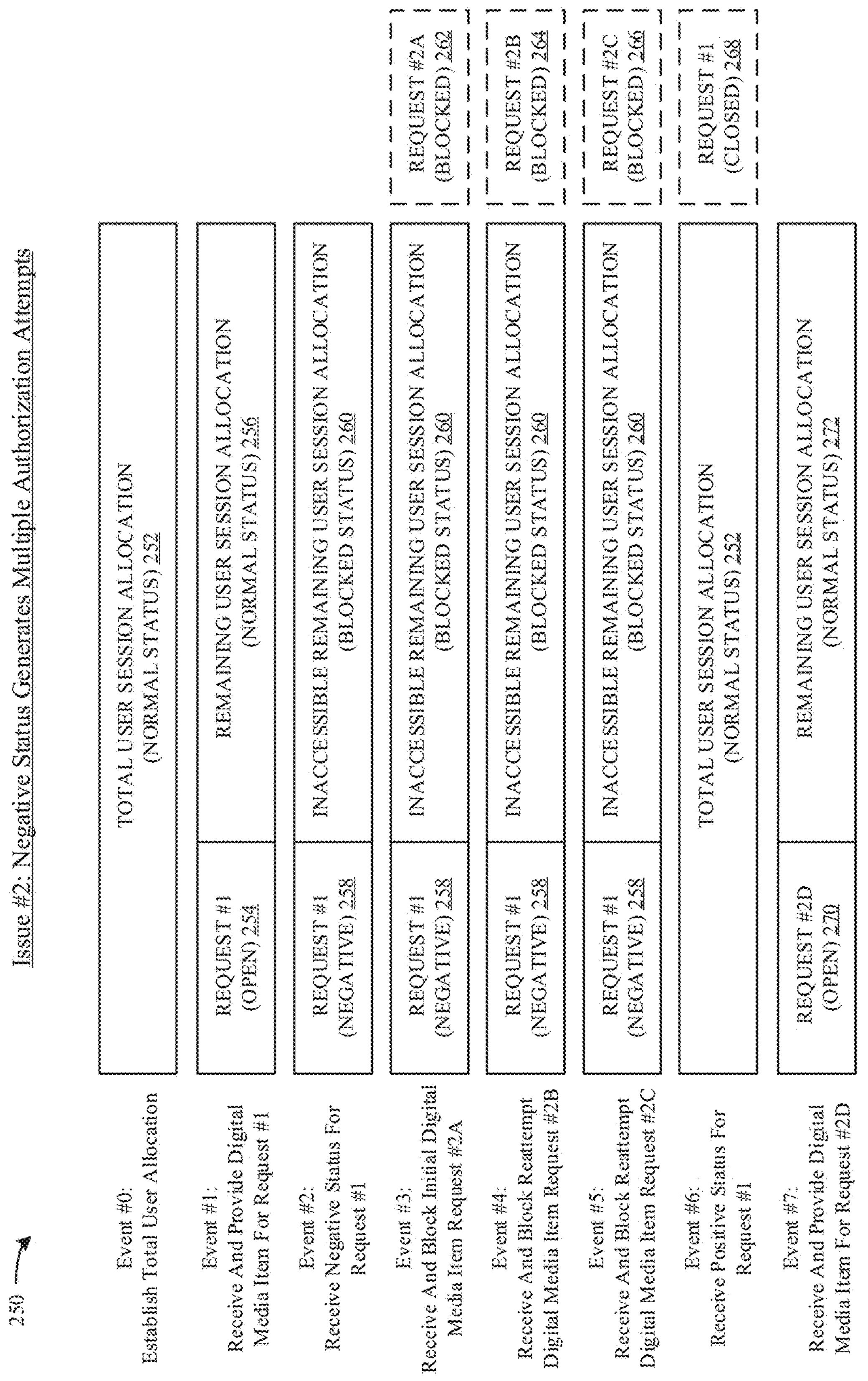

FIG. 2B illustrates a diagram 250 of another exemplary sequence of events that can impede digital media item provisioning for a user device 114 or for a user thereof, according to some embodiments. For example, a negative status indication for a first digital media item request can result in repeated digital media item requests from the user device 114 or from the user thereof for a particular digital media item, such as for a renewal of an ongoing subscription. At a first event #0, a network-based server, e.g., a server device 102, can establish a total user session allocation 252 for a digital media item delivery queue for a user device 114 or for a user with an initial normal status indication for the digital media item delivery queue. At a second event #1, the server device 102 can receive, from a user device 114 or from a user thereof, a request for a first digital media item, e.g., request #1, which can be provided to the user device 114 or to the user thereof. The first digital media item can be provided in advance of receipt of a final authorization for providing the first digital media item to the user device 114 or to the user thereof, e.g., based on an initial authorization or a standing authorization for the user device 114 or for the user thereof. The digital media item delivery queue can be updated to reflect the requested and provided first digital media item, as indicated by request #1 with an open status indication in block 254, where request #1 for the first digital media item can occupy a portion of the total user session allocation for the digital media item delivery queue for the user device 114 or for the user thereof, with a remaining user session allocation indicated by block 256 (and having a normal status indication).

At a third event #2, the server device 102 can receive a negative status indication for the first request #1 for the first digital media item, which can cause the status of the first request #1 to be updated to a negative status, as shown in block 258, and the digital media item delivery queue can be updated based on the negative status for the first request #1 to disallow additional digital media item requests while the negative status for the first request #1 remains unresolved. In particular, the digital media item delivery queue can be updated to block access to the remaining user session allocation while the negative status for the first request #1 is unresolved, resulting in a blocked status for the remaining user session allocation of the digital media item delivery queue for the user device 114 or the user thereof, as indicated by block 260.

At a fourth event #3, the server device 102 can receive, from the user device 114 or from the user thereof, an initial request for a second digital media item, e.g., request #2A, which can be blocked from being provided to the user device 114 or to the user thereof based on the blocked status of the remaining user session allocation for the digital media item delivery queue, as indicated by the blocked request #2A in block 262. At a fifth event #4, the server device 102 can receive, from the user device 114 or from the user thereof, a repeat (reattempt) request for the second digital media item, e.g., request #2B, which can also be blocked from being provided to the user device 114 or to the user thereof based on the blocked status of the remaining user session allocation for the digital media item delivery queue, as indicated by the blocked request #2B in block 264. At a sixth event #5, the server device 102 can receive, from the user device 114 or from the user thereof, another repeat (reattempt) request for the second digital media item, e.g., request #2C, which can further be blocked from being provided to the user device 114 or to the user thereof based on the blocked status of the remaining user session allocation for the digital media item delivery queue, as indicated by the blocked request #2C in block 266.

At a seventh event #6, the server device 102 can receive a positive status indication for the first request #1 for the first digital media item, which can cause the status of the first request #1 for the first digital media item to be updated to a closed status, as shown in block 268, and the digital media item delivery queue can be updated to reflect closure of the request #1 for the first digital media item, returning to a total user session allocation 252. At an eighth event #7, the server device 102 can receive, from the user device 114 or from the user thereof, a repeat request for the second digital media item, e.g., request #2D, which can be provided to the user device 114 or to the user thereof. The second digital media item can be provided in advance of receipt of a final authorization for providing the second digital media item to the user device 114 or to the user thereof, e.g., based on an initial authorization or a standing authorization for the user device 114 or for the user thereof. The digital media item delivery queue can be updated to reflect the requested and provided second digital media item, as indicated by request #2D with an open status indication in block 270, where request #2D for the first digital media item can occupy a portion of the total user session allocation for the digital media item delivery queue for the user device 114 or for the user thereof, with a remaining user session allocation indicated by block 272 (and having a normal status indication).

Before resolution of the negative status, however, repeated requests for a digital media item have been denied. These repeated requests, in some cases, can result in repeated attempts for authorization for the requested digital media item and consume network resources unnecessarily. In some cases, a customer that is denied access to a digital media item based on a blocked request can result in loss of the customer for that digital media item, which can negatively impact customer retention for certain services, such as for ongoing subscriptions to a service, where the denied digital media item is a periodic renewal of the subscription. Thus, there exists a need to manage digital media item delivery queues when negative status indications are received to improve customer retention and manage customer experience until the negative status indications are resolved.

Figure 3:
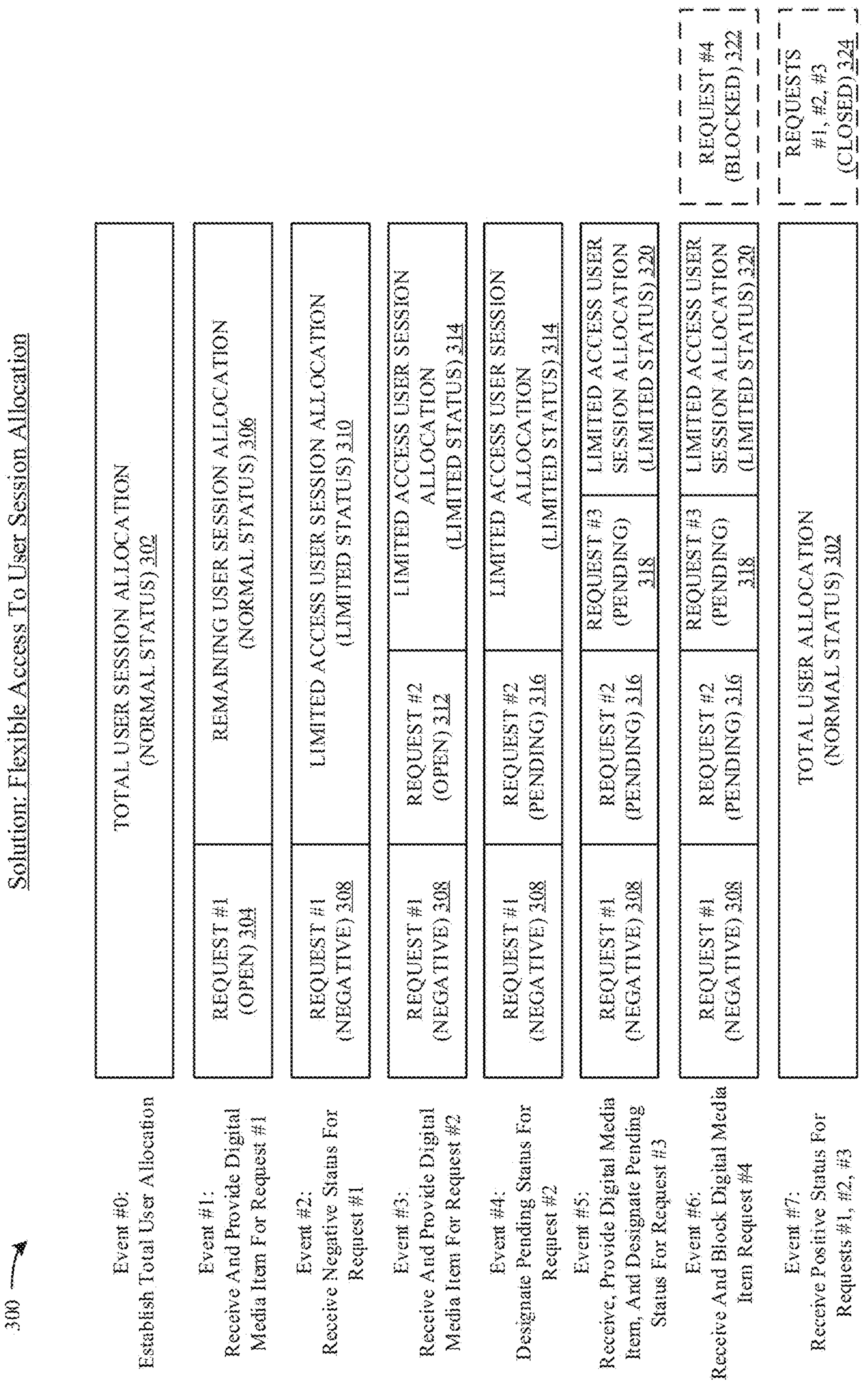
FIG. 3 illustrates a diagram of an exemplary sequence of events associated with managing digital media item delivery queues for a user device, according to some embodiments.

FIG. 3 illustrates a diagram 300 of an exemplary sequence of events associated with managing a digital media item delivery queue for a user device 114 or a user thereof to allow for flexible access to a user session allocation for the digital media item delivery queue, according to some embodiments. At a first event #0, a network-based server, e.g., a server device 102, can establish a total user session allocation 302 for a digital media item delivery queue for a user device 114 or for a user with an initial normal status indication for the digital media item delivery queue. At a second event #1, the server device 102 can receive, from a user device 114 or from a user thereof, a request for a first digital media item, e.g., request #1, which can be provided to the user device 114 or to the user thereof. The first digital media item can be provided in advance of receipt of a final authorization for providing the first digital media item to the user device 114 or to the user thereof, e.g., based on an initial authorization or a standing authorization for the user device 114 or for the user thereof. The digital media item delivery queue can be updated to reflect the requested and provided first digital media item, as indicated by request #1 with an open status indication in block 304, where request #1 for the first digital media item can occupy a portion of the total user session allocation for the digital media item delivery queue for the user device 114 or for the user thereof, with a remaining user session allocation indicated by block 306 (and having a normal status indication).

At a third event #2, the server device 102 can receive a negative status indication for the first request #1 for the first digital media item, which can cause the status of the first request #1 to be updated to a negative status, as shown in block 308, and the digital media item delivery queue can be updated based on the negative status for the first request #1 to allow limited access to the user session allocation for the digital media item delivery queue, as indicated by the limited status for the limited access user session allocation in block 310, while the negative status for the first request #1 remains unresolved. In some embodiments, the limited access user session allocation with limited status (denoted in block 310) can differ in scope from the remaining user session allocation with normal status (denoted in block 306). For example, only certain digital media items or digital media items of a certain type may be allowed to be used against the limited access user session allocation. In some embodiments, digital media items of a first party, such as managed by an original equipment manufacturer (OEM) of the user device 114 or for which the user of the user device 114 has an account in good standing can be allowed. In some embodiments, renewals of a subscription type of service or modifications to a subscription type of service (e.g., addition of a feature) can be allowed to assist with customer retention while the negative status of the previous digital media item request is being resolved.

At a fourth event #3, the server device 102 can receive, from the user device 114 or from the user thereof, a request for a second digital media item, e.g., request #2, which can be provided to the user device 114 or to the user thereof when certain criteria for the request #2 are satisfied. The digital media item delivery queue can be updated to reflect the requested and provided second digital media item, as indicated by request #2 with an open status indication in block 312, where request #2 for the second digital media item can occupy a portion of the limited access user session allocation for the digital media item delivery queue for the user device 114 or for the user thereof, with a remaining limited user session allocation indicated by block 314 (and having a limited status indication). At a fifth event #4, a status of the request #2 for the second digital media item can be put into a pending state, as indicated in block 316, awaiting resolution of the negative status for the previous request #1 for the first digital media item. At a sixth event #5, the server device 102 can receive, from the user device 114 or from the user thereof, a request for a third digital media item, e.g., request #3, which can also be provided to the user device 114 or to the user thereof when certain criteria for the request #3 are satisfied. The digital media item delivery queue can be updated to reflect the requested and provided third digital media item, as indicated by request #3 with a pending status indication in block 318, where request #3 for the third digital media item can occupy an additional portion of the limited access user session allocation for the digital media item delivery queue for the user device 114 or for the user thereof, with a remaining limited user session allocation indicated by block 320 (and having a limited status indication).

At a seventh event #6, the server device 102 can receive, from the user device 114 or from the user thereof, a request for a fourth digital media item, e.g., indicated as request #4, which can be blocked from being provided to the user device 114 or to the user thereof, as indicated by block 322. The fourth digital media item can be blocked based on certain criteria for the request #4 not being satisfied. For example, the value of the fourth digital media item can exceed an amount of digital media item value available in the limited access user session allocation with limited status (indicated by block 320). As another example, the value of the fourth digital media item can exceed a threshold value amount allowed for digital media items while a negative status for a previous digital media item request remains unresolved. As a further example, the fourth digital media item can be not included in a limited set of digital media items allowable while a negative status for a previous digital media item request remains unresolved. A request for renewal of a subscription can be allowed, while a request for a new subscription can be disallowed. A request for renewal of a service or access to a new service managed by a first party, e.g., an OEM of the user device 114, can be allowed, where the first party has an ongoing customer relationship with the user of the user device 114, while a request for a new service managed by a third party can be disallowed.

At an eighth event #7, the server device 102 can receive a positive status indication for the first request #1 for the first digital media item, which can cause the status of the first request #1 for the first digital media item to be updated to a closed status, and which can also cause the status of the additional requests #2 and #3 for the second and third digital media items with a pending status to be updated to a closed status as shown in block 324. The digital media item delivery queue can be updated to reflect closure of the requests #1, #2, and #3 for the first, second, and third digital media items, returning to a total user session allocation 302. Before resolution of the negative status, requests for certain digital media items are allowed when certain criteria are satisfied, rather than being denied as described for FIGS. 2A and 2B, thereby improving the customer experience and customer retention.

Figure 4A:
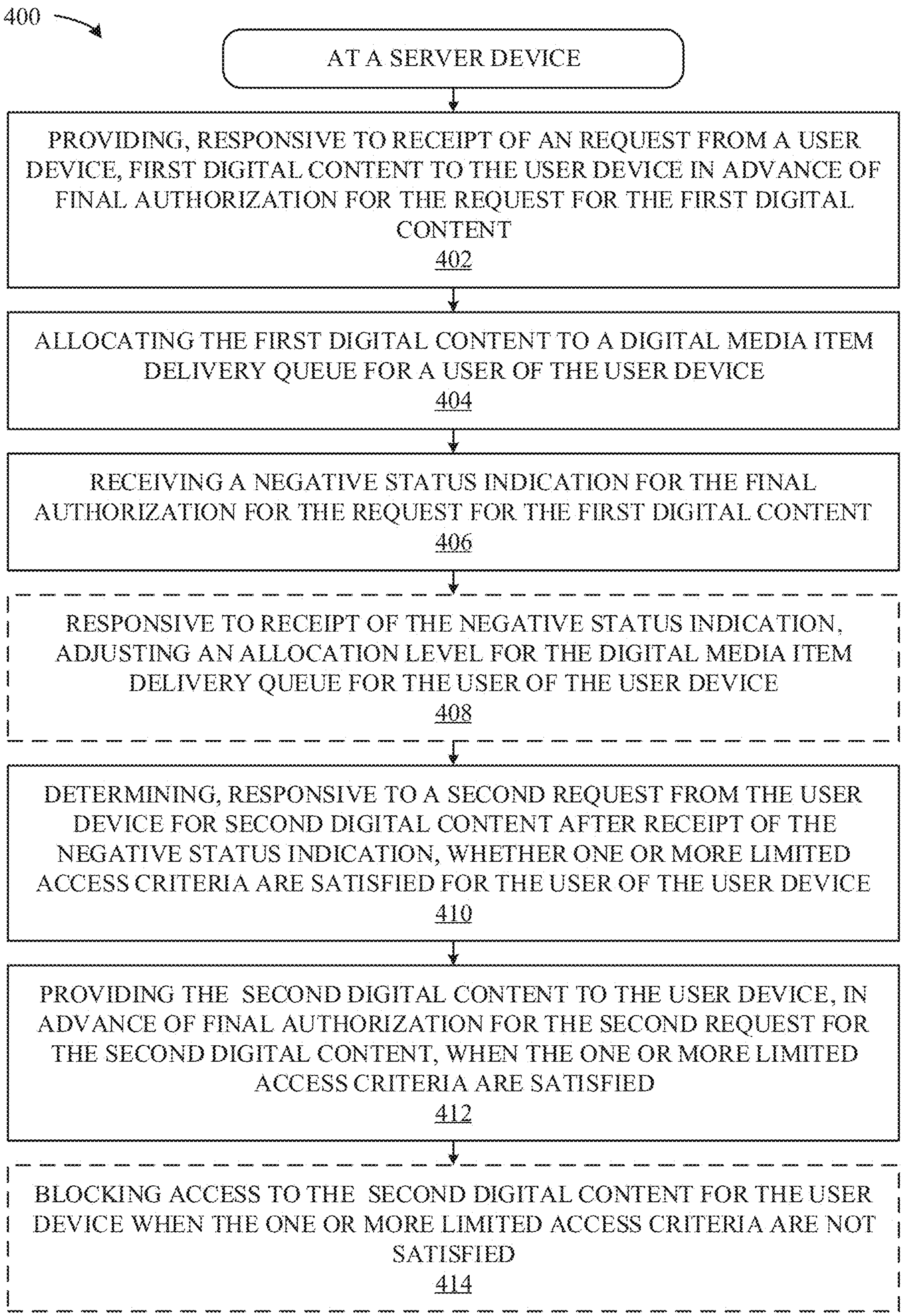
FIGS. 4A and 4B illustrate exemplary methods for managing digital media item delivery queues for a user and/or a user device, according to some embodiments.

FIG. 4A illustrates a flowchart 400 of an exemplary method for managing digital media item delivery queues for a user device 114, according to some embodiments. According to some embodiments, the method can be performed by a server device 102. At step 402, the server device 102 provides, responsive to receipt of a request from a user device 114, first digital content to the user device 114 in advance of final authorization for the request for the first digital content. The server device 102 can provide initial authorization and provision the first digital content to the user device 114. Exemplary digital content include a software application, streaming media content, a digital music download, a digital periodical, and the like. At step 404, the server device 102 allocates the first digital content to a digital media item delivery queue for a user of the user device 114 (or a digital media item delivery queue for the user device 114). In some embodiments, a user of one or more user devices 114 can be associated with one or more digital media item delivery queues. In some embodiments, one or more user devices 114 associated with a common user can each be associated with a digital media item delivery queue. In some embodiments, a single digital media item delivery queue for a user can used for a set of associated user devices 114. In some embodiments, the user of the user device 114 is associated with a user account for a cloud-based service. In some embodiments, the cloud-based service can be provided by and/or managed by an original equipment manufacturer (OEM), and one or more user devices 114 of a user can be registered with the user account for the user.

At step 406, the server device 102 receives a negative status indication for the final authorization for the request for the first digital content. In some embodiments, the negative status indication includes an indication that the user of the user device 114 lacks authorization to access the first digital content. In some embodiments, the negative status indication includes an indication that remuneration for the first digital content is denied. At step 408, the server device 102 optionally responds to receipt of the negative status indication and adjusts an allocation level for the digital media item delivery queue for the user of the user device 114. In some embodiments, adjustment of the allocation level includes lowering a total permissible allocation for digital media item provisioning to the user of the user device 114 (or specifically to the user device 114). At step 410, the server device 102 determines, responsive to a second request from the user for second digital content after receipt of the negative status indication, whether one or more limited access criteria are satisfied for the user of the user device 114. In some embodiments, the one or more limited access criteria are satisfied when an account for the user with an original equipment manufacturer (OEM) of the user device is in good standing, such as when a user account with a cloud-based service is provided and/or managed by the OEM and with which the user device 114 is registered is in good standing. In some embodiments, the one or more limited access criteria are satisfied when the second request for second digital content includes renewal of a subscription for digital content provided through a service managed by an OEM of the user device 114. In some embodiments, the one or more limited access criteria are satisfied when the second request for second digital content includes changing an existing subscription for digital content provided through a service managed by an OEM of the user device 114.

At step 412, the server device 102 provides the second digital content to the user device 114, in advance of final authorization for the second request for the second digital content, when the one or more limited access criteria are satisfied. In some embodiments, at step 414, the server device 102 blocks access to the second digital content for the user device 114, when the one or more limited access criteria are not satisfied. In some embodiments, the server device 102 adjusts, responsive to receipt of an indication resolving the negative status indication for the final authorization for the request for the first digital content, the allocation level for the digital media item delivery queue for the user of the user device 114. In some embodiments, re-adjustment of the allocation includes raising the total permissible allocation for digital media item provisioning to the user of the user device 114 to a previously established level.

Figure 4B:
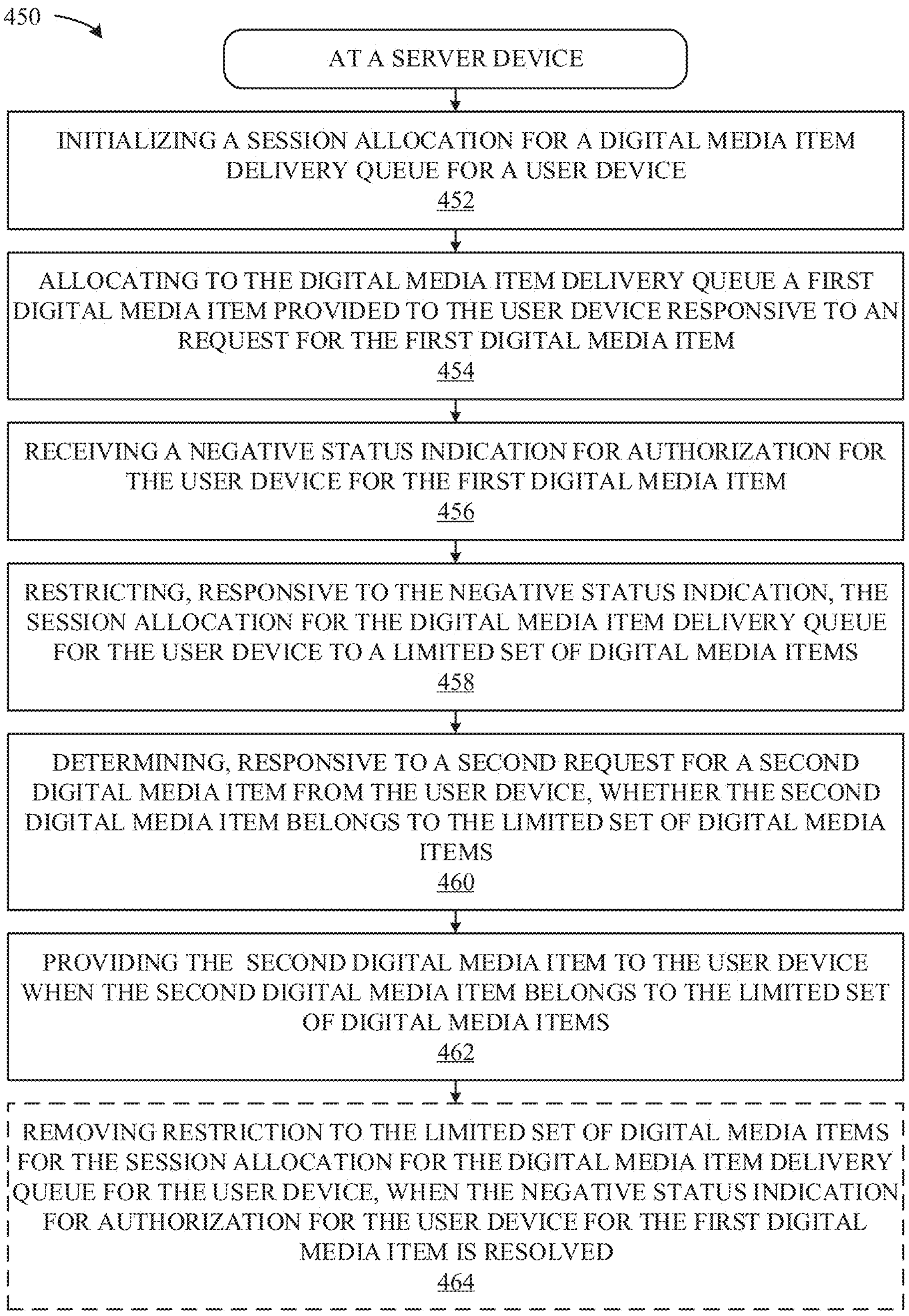

FIG. 4B illustrates a flowchart 450 of another exemplary method for managing digital media item delivery queues for a user device 114, according to some embodiments. According to some embodiments, the method can be performed by a server device 102. At step 452, the server device 102 initializes a session allocation for a digital media item delivery queue for a user device 114. At step 454, the server device 102 allocating to the digital media item delivery queue a first digital media item provided to the user device 114 responsive to a request from the user device 114. At step 456, the server device 102 receives a negative status indication for authorization for the user device 114 for the first digital media item. In some embodiments, the first digital media item includes first digital content, and the negative status indication includes an indication that the user of the user device 114 lacks authorization to access the first digital content.

At step 458, the server device 102, responsive to the negative status indication, restricts the session allocation for the digital media item delivery queue for the user device 114 to a limited set of digital media items. In some embodiments, the limited set of digital media items includes renewal of an existing digital content service subscription managed by an original equipment manufacturer (OEM) of the user device 114. In some embodiments, the limited set of digital media items include digital media items of an OEM of the user device 114 having a value below a designated threshold value. At step 460, the server device 102, responsive to a second request for a second digital media item from the user device 114, determines whether the second digital media item belongs to the limited set of digital media items.

At step 462, the server device 102 provides the second digital media item to the user device 114 when the second digital media item belongs to the limited set of digital media items. In some embodiments, the server device 102 blocks access to the second digital media item for the user device 114 when the second digital media item does not belong to the limited set of digital media items. In some embodiments, at step 464, the server device 102 removes the restriction to the limited set of digital media items for the session allocation for the digital media item delivery queue for the user device 114, when the negative status indication for authorization for the user device 114 for the first digital media item is resolved.

Figure 5:
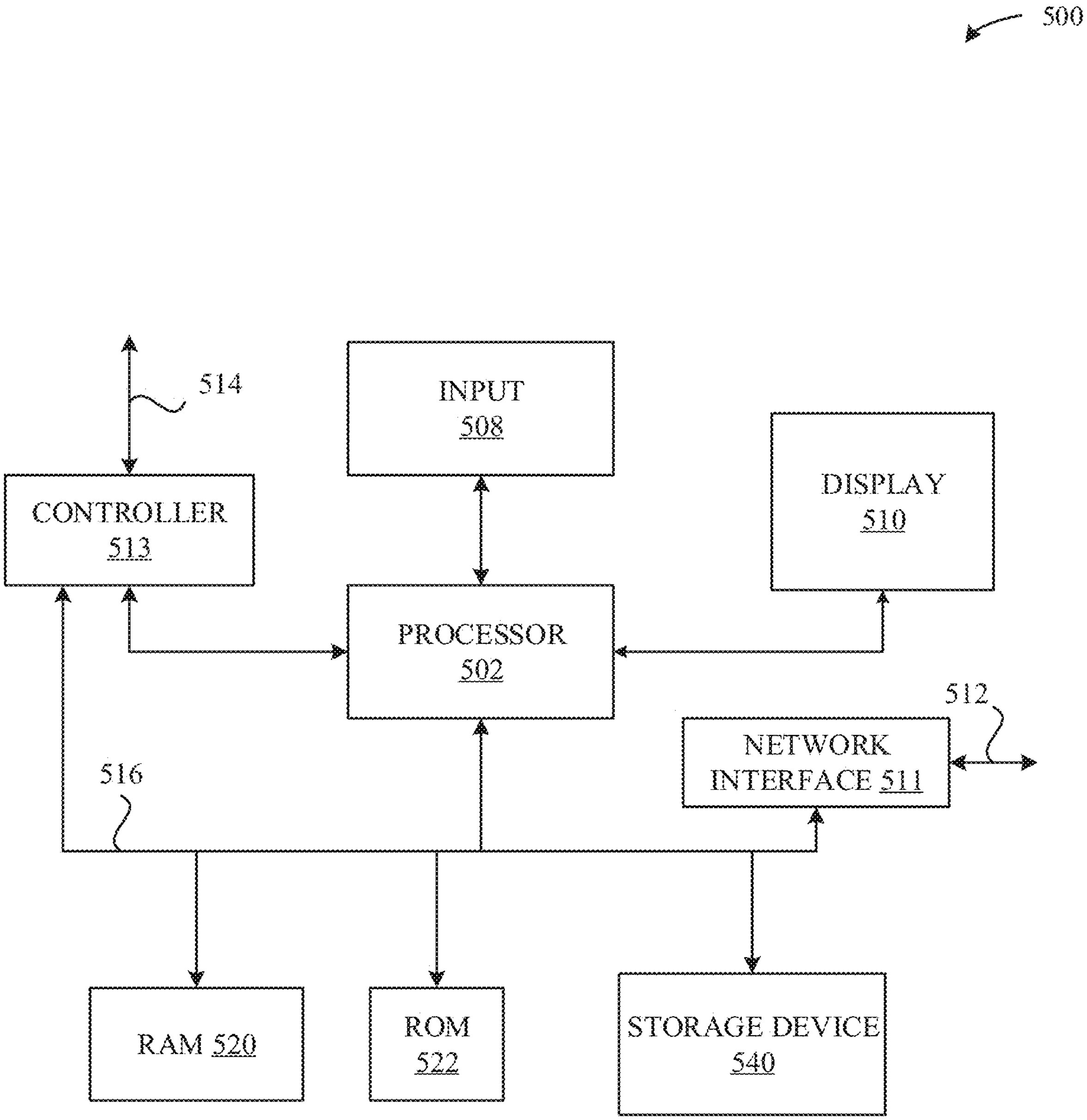
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in server computing devices 102, payment processors 112, and client computing devices 114 described above in conjunction with FIG. 1.

As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Furthermore, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also includes a storage device 540, which can include a single disk or a plurality of disks (e.g., SSDs), and includes a storage management module that manages one or more partitions within the storage device 540. In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing devices described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

As described herein, one aspect of the present technology is the gathering and use of data available from various sources to improve user experiences. The present disclosure contemplates that in some instances, this gathered data may include personal information data that uniquely identifies or can be used to contact or locate a specific person. Such personal information data can include demographics data, location-based data, telephone numbers, email addresses, home addresses, data or records relating to a user's health or level of fitness (e.g., vital signs measurements, medication information, exercise information), date of birth, smart home activity, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select to provide only certain types of data that contribute to the techniques described herein. In addition to providing "opt in" and "opt out" options, the present disclosure contemplates providing notifications relating to the access or use of personal information. For instance, a user may be notified that their personal information data may be accessed and then reminded again just before personal information data is accessed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing digital media item delivery queues, the method comprising, at a server device:

providing, responsive to receipt of a request from a user device, first digital content to the user device in advance of final authorization for the request for the first digital content;

allocating the first digital content to a digital media item delivery queue for a user of the user device;

receiving a negative status indication for the final authorization for the request for the first digital content;

determining, responsive to a second request from the user for second digital content after receipt of the negative status indication, whether one or more limited access criteria are satisfied for the user of the user device;

providing the second digital content to the user device, in advance of final authorization for the second request for the second digital content, when the one or more limited access criteria are satisfied; and adjusting, responsive to receipt of the negative status indication, an allocation level for the digital media item delivery queue for the user of the user device, wherein adjustment of the allocation level includes lowering a total permissible allocation for digital media item provisioning to the user of the user device.

2. The method of claim 1, further comprising:

re-adjusting, responsive to receipt of an indication resolving the negative status indication for the final authorization for the request for the first digital content, the allocation level for the digital media item delivery queue for the user of the user device.

3. The method of claim 2, wherein re-adjustment of the allocation level comprises raising the total permissible allocation for digital media item provisioning to the user of the user device to a previously established level.

4. The method of claim 1, wherein the negative status indication comprises an indication that the user of the user device lacks authorization to access the first digital content.

5. The method of claim 1, wherein the negative status indication comprises an indication that remuneration for the first digital content is denied.

6. The method of claim 1, wherein the one or more limited access criteria are satisfied when an account for the user with an original equipment manufacturer (OEM) of the user device is in good standing.

7. The method of claim 1, wherein the one or more limited access criteria are satisfied when the second request for second digital content comprises renewal of a subscription for digital content provided through a service managed by an OEM of the user device.

8. The method of claim 1, wherein the one or more limited access criteria are satisfied when the second request for second digital content comprises changing an existing subscription for digital content provided through a service managed by an OEM of the user device.

9. The method of claim 1, further comprising:

blocking access to the second digital content for the user device, when the one or more limited access criteria are not satisfied.

10. A method for managing digital media item delivery queues, the method comprising, at a server device:

initializing a session allocation for a digital media item delivery queue for a user device;

allocating to the digital media item delivery queue a first digital media item provided to the user device responsive to a request from the user device;

receiving a negative status indication for authorization for the user device for the first digital media item;

restricting, responsive to the negative status indication, the session allocation for the digital media item delivery queue for the user device to a limited set of digital media items;

determining, responsive to a second request for a second digital media item from the user device, whether the second digital media item belongs to the limited set of digital media items;

providing the second digital media item to the user device when the second digital media item belongs to the limited set of digital media items; and removing restriction to the limited set of digital media items for the session allocation for the digital media item delivery queue for the user device, when the negative status indication for authorization for the user device for the first digital media item is resolved.

11. The method of claim 10, further comprising:

blocking access to the second digital media item for the user device when the second digital media item does not belong to the limited set of digital media items.

12. The method of claim 10, wherein the limited set of digital media items comprises renewal of an existing digital content service subscription managed by an original equipment manufacturer (OEM) of the user device.

13. The method of claim 10, wherein the limited set of digital media items comprise digital media items of an OEM of the user device having a value below a designated threshold value.

14. The method of claim 10, wherein:

the first digital media item comprises first digital content; and the negative status indication comprises an indication that a user of the user device lacks authorization to access the first digital content.

15. A non-transitory computer readable storage medium configured to store instructions that, when executed by at least one processor included in a server device, cause the server device to manage digital media item delivery queues, by carrying out steps that include:

providing, responsive to receipt of a request from a user device, first digital content to the user device in advance of final authorization for the request for the first digital content;

allocating the first digital content to a digital media item delivery queue for a user of the user device;

receiving a negative status indication for the final authorization for the request for the first digital content;

determining, responsive to a second request from the user for second digital content after receipt of the negative status indication, whether one or more limited access criteria are satisfied for the user of the user device;

providing the second digital content to the user device, in advance of final authorization for the second request for the second digital content, when the one or more limited access criteria are satisfied; and adjusting, responsive to receipt of the negative status indication, an allocation level for the digital media item delivery queue for the user of the user device, wherein adjustment of the allocation level includes lowering a total permissible allocation for digital media item provisioning to the user of the user device.

16. The non-transitory computer readable storage medium of claim 15, wherein the steps further include:

lowering, responsive to receipt of the negative status indication, a total permissible allocation level for the digital media item delivery queue for provisioning digital media items to the user of the user device.

17. The non-transitory computer readable storage medium of claim 16, wherein the steps further include:

re-adjusting, responsive to receipt of an indication resolving the negative status indication for the final authorization for the request for the first digital content, the total permissible allocation level for the digital media item delivery queue for provisioning digital media items to the user of the user device to a previously established level.

* * * * *